US012548042B2

(12) United States Patent
Kurani et al.

(10) Patent No.: US 12,548,042 B2
(45) Date of Patent: Feb. 10, 2026

(54) PAY WITH POINTS VIRTUAL CARD

(71) Applicant: Wells Fargo Bank, N.A., San Francisco, CA (US)

(72) Inventors: Ashish B. Kurani, Hillsborough, CA (US); Steven E. Puffer, Champlin, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/384,093

(22) Filed: Oct. 26, 2023

(65) Prior Publication Data

US 2024/0054524 A1 Feb. 15, 2024

Related U.S. Application Data (63) Continuation of application No. 17/728,500, filed on Apr. 25, 2022, now Pat. No. 11,823,224, which is a
(Continued)

(51) Int. Cl.
*G06Q 30/02* (2023.01)
*G06Q 20/32* (2012.01)
(Continued)

(52) U.S. Cl.
CPC ..... *G06Q 30/0233* (2013.01); *G06Q 20/3223* (2013.01); *G06Q 20/351* (2013.01);
(Continued)

(58) Field of Classification Search
CPC .......... G06Q 30/0233; G06Q 20/3223; G06Q 20/351; G06Q 20/3829; G06Q 20/4014;
(Continued)

(56) References Cited

U.S. PATENT DOCUMENTS 5,870,473 A 2/1999 Boesch et al.
6,018,718 A * 1/2000 Walker .................. G06Q 40/00
705/14.27
(Continued)

FOREIGN PATENT DOCUMENTS

CA 2681855 A1 10/2008

OTHER PUBLICATIONS

Hassan Abolhassani, Global Reward Search and Redemption Platform, Oct. 30, 2017, The IP.com Prior Art Database, pp. 1-12 (Year: 2017).*

(Continued)

*Primary Examiner* — Nilesh B Khatri
(74) *Attorney, Agent, or Firm* — Foley & Lardner LLP (57) ABSTRACT

A method includes receiving a payment request for a transaction between a merchant and a customer. The payment request includes a payment token and an amount of the transaction in currency. The rewards account stores a number of rewards points. The method includes authenticating the payment request. The method includes determining a currency conversion value for the rewards points. The currency conversion value is based on a conversion rate and a merchant multiplier. The method includes determining the number of rewards points is not enough to cover the transaction. The method includes identifying a secondary payment source that contains sufficient funds to cover a remaining balance of the transaction. The method includes transmitting an approval message to a merchant computing system.

16 Claims, 4 Drawing Sheets

Related U.S. Application Data continuation of application No. 15/869,802, filed on Jan. 12, 2018, now Pat. No. 11,315,137, which is a continuation-in-part of application No. 15/824,687, filed on Nov. 28, 2017, now Pat. No. 11,423,395.

(60) Provisional application No. 62/440,259, filed on Dec. 29, 2016.

(51) Int. Cl.

| | | |
|---|---|---|
| *G06Q 20/34* | (2012.01) | |
| *G06Q 20/38* | (2012.01) | |
| *G06Q 20/40* | (2012.01) | |
| *G06Q 30/0207* | (2023.01) | |
| *G06Q 30/0226* | (2023.01) | |
| *G06Q 20/20* | (2012.01) | |
| *G06Q 20/36* | (2012.01) | |
| *G06Q 30/0238* | (2023.01) | |
| *H04W 12/06* | (2021.01) | |

(52) U.S. Cl.
CPC ..... *G06Q 20/3829* (2013.01); *G06Q 20/4014* (2013.01); *G06Q 30/0215* (2013.01); *G06Q 20/202* (2013.01); *G06Q 20/36* (2013.01); *G06Q 30/0238* (2013.01); *G06Q 2220/00* (2013.01); *H04W 12/06* (2013.01)

(58) Field of Classification Search
CPC .. G06Q 30/0214; G06Q 20/202; G06Q 20/36; G06Q 30/0238; G06Q 2220/00; H04W 12/06
See application file for complete search history.

(56) References Cited

U.S. PATENT DOCUMENTS

| | | | |
|---|---|---|---|
| 6,266,647 B1 * | 7/2001 | Fernandez | G06Q 30/0226 705/14.27 |
| 8,636,203 B1 * | 1/2014 | Patterson | G06Q 20/405 235/379 |
| 9,972,047 B1 | 5/2018 | Elliott et al. | |
| 11,481,766 B2 | 10/2022 | Leite Netto et al. | |
| 2002/0111919 A1 | 8/2002 | Weller et al. | |
| 2004/0122736 A1 * | 6/2004 | Strock | G06Q 30/0207 705/14.31 |
| 2004/0267672 A1 | 12/2004 | Gray et al. | |
| 2007/0192182 A1 * | 8/2007 | Monaco | G06Q 30/0238 705/14.36 |
| 2008/0103968 A1 * | 5/2008 | Bies | G06Q 20/06 705/39 |
| 2008/0133350 A1 * | 6/2008 | White | G06Q 30/0226 705/14.27 |
| 2008/0230603 A1 * | 9/2008 | Stawar | G06Q 30/04 235/383 |
| 2010/0131342 A1 * | 5/2010 | Thibedeau | G06Q 30/0238 705/21 |
| 2011/0251882 A1 * | 10/2011 | Richard | G06Q 30/0233 705/14.1 |
| 2012/0150606 A1 | 6/2012 | Navar et al. | |
| 2013/0103484 A1 | 4/2013 | Mclaughlin | |
| 2013/0185152 A1 | 7/2013 | Aaron et al. | |
| 2013/0262317 A1 | 10/2013 | Collinge et al. | |
| 2014/0040146 A1 | 2/2014 | Fiske | |
| 2014/0040149 A1 | 2/2014 | Fiske | |
| 2014/0263618 A1 | 9/2014 | Mccarthy et al. | |
| 2014/0279554 A1 | 9/2014 | Priebatsch et al. | |
| 2015/0032627 A1 * | 1/2015 | Dill | G06Q 20/40 705/44 |
| 2015/0088626 A1 * | 3/2015 | Salmon | G06Q 20/227 705/14.17 |
| 2015/0088629 A1 | 3/2015 | Dubey et al. | |
| 2015/0178724 A1 * | 6/2015 | Ngo | G06Q 20/327 705/71 |
| 2015/0199689 A1 | 7/2015 | Kumnick et al. | |
| 2015/0262170 A1 | 9/2015 | Bouda | |
| 2015/0332262 A1 | 11/2015 | Lingappa | |
| 2016/0057619 A1 | 2/2016 | Lopez | |
| 2016/0063496 A1 * | 3/2016 | Royyuru | G06Q 20/405 713/168 |
| 2016/0092868 A1 | 3/2016 | Salama et al. | |
| 2016/0343016 A1 * | 11/2016 | Joshi | G06Q 30/0233 |
| 2016/0350789 A1 | 12/2016 | Joglekar et al. | |
| 2018/0101857 A1 | 4/2018 | Deliwala et al. | |
| 2019/0362334 A1 | 11/2019 | Wang et al. | |
| 2019/0363889 A1 * | 11/2019 | Wang | G06F 21/32 |
| 2020/0042972 A1 | 2/2020 | Wang et al. | |
| 2020/0250648 A1 | 8/2020 | Sanchez et al. | |
| 2023/0206217 A1 | 6/2023 | Gaddam et al. | |

OTHER PUBLICATIONS

A. Nandwani, R. Edwards, and P. Coulton, Contactless check-ins using implied locations: A NFC solution simplifying business to consumer interaction in location based services, Apr. 29, 2013, IEEE, pp. 39-44 (Year: 2013).

Uschi Buchinger, et al., Virtual Currency for Online Platforms: Business Model Implications, Sep. 18, 2015, IEEE, pp. 1-11 (Year: 2015).

* cited by examiner

PAY WITH POINTS VIRTUAL CARD

CROSS-REFERENCE TO RELATED APPLICATION

This application is a continuation of U.S. application Ser. No. 17/728,500, filed Apr. 25, 2022, which is a continuation of U.S. application Ser. No. 15/869,802, filed Jan. 12, 2018, now U.S. Pat. No. 11,315,137, which is a continuation-in-part of U.S. application Ser. No. 15/824,687, filed Nov. 28, 2017, now U.S. Pat. No. 11,423,395, which claims priority to U.S. Provisional Patent Application No. 62/440,259, filed Dec. 29, 2016, each of which are incorporated herein by reference in their entireties.

TECHNICAL FIELD

Embodiments of the present disclosure relate to systems and methods for allowing users to pay with rewards points directly.

BACKGROUND

Many consumers use rewards credit cards to make purchases. The rewards credit cards allow the consumers to accrue rewards points or credits when the credit cards are used and/or the credit card bills are paid. The rewards points or credits for a given credit card are typically maintained by the issuing financial institution associated with the credit card. The consumer can then use rewards points or credits by converting the points into currency and, for example, applying the currency to pay down a credit card bill balance, depositing the currency into a bank account, withdrawing the currency from an ATM or the like. However, this process can be cumbersome and often requires the consumer to log into a rewards account, convert the points into currency, and use the currency (as described above).

SUMMARY

One example embodiment relates to a method of processing a payment request associated with a virtual account linked to a rewards account. The method includes receiving, by a financial institution computing system associated with a financial institution, a payment request from a merchant point-of-sale (POS) system for a transaction between a merchant and a customer. The payment request includes a payment token and an amount of the transaction in currency. The payment token is associated with the rewards account and the rewards account stores a balance of rewards points. The method further includes determining a number of rewards points in the rewards account, determining that the number of rewards points in the rewards account is not enough to cover the amount of the transaction in currency at a conversion rate of point to currency, and transmitting a partial authorization message to the merchant POS system. The partial authorization message includes an approval amount in currency corresponding to the balance of rewards points in the rewards account.

Another example embodiment relates to a financial institution computing system associated with a financial institution. The system includes a network interface configured to communicate data to and from other devices via a network. The system further includes an accounts database configured to store information relating to a plurality of accounts maintained by the financial institution. The system includes a processing circuit comprising a processor and memory. The processing circuit is configured to receive a payment request from a merchant point-of-sale (POS) system for a transaction between a merchant and a customer. The payment request includes a payment token and an amount of the transaction in currency. The payment token is associated with the rewards account. The rewards account stores a balance of rewards points. The processing circuit is configured to determine a number of rewards points in the rewards account, determine that the number of rewards points in the rewards account is not enough to cover the amount of the transaction in currency at a conversion rate of point to currency, and transmit a partial authorization message to the merchant POS system. The partial authorization message includes an approval amount in currency corresponding to the balance of rewards points in the rewards account.

These and other features, together with the organization and manner of operation thereof, will become apparent from the following detailed description when taken in conjunction with the accompanying drawings.

DETAILED DESCRIPTION

Referring to the figures generally, systems and methods for providing a rewards payment form linked directly to a rewards account are described. The rewards account is funded with rewards points based at least in part on a customer's usage of a credit card that earns the rewards points. The rewards points may be spent by the customer by converting the points to currency (e.g., points to US Dollars) and applying the converted currency to a credit card statement, withdrawing the converted currency from an ATM, or depositing the converted currency into a bank account (e.g., a demand deposit account such as a checking or savings account). Additionally, the rewards points may be spent directly by the customer through the use of the payment form linked to the rewards account. The payment form may be a payment card (e.g., a physical card having an account number accessible via a magstripe, an EMV chip, etc.) or a virtual payment card loaded into a mobile wallet accessible by the customer. The rewards payment form allows the customer to spend the rewards points stored in the rewards account without first going through the extra step of converting the rewards points into currency.

As used herein, "points" or "rewards points" refer to rewards issued by a financial institution to a customer that can be redeemed through the financial institution and/or exchanged into currency by the financial institution at an exchange rate that is defined by the financial institution and/or redeemed for products or services through a financial institution rewards catalog. In some arrangements, points are not generally accepted outside of the financial institution, and thus, have no value outside of the financial institution. In other arrangements, points maintain a value to institutions other than the financial institution. "Currency" refers to fiat currency (e.g., U.S. Dollars, Euros, etc.) or other forms of generally accepted money (e.g., math-based currencies, crypto currencies, etc.) that are not issued by the financial institution and that can be used by the customer directly to make purchases, pay bills, make withdrawals, etc.

Figure 1:
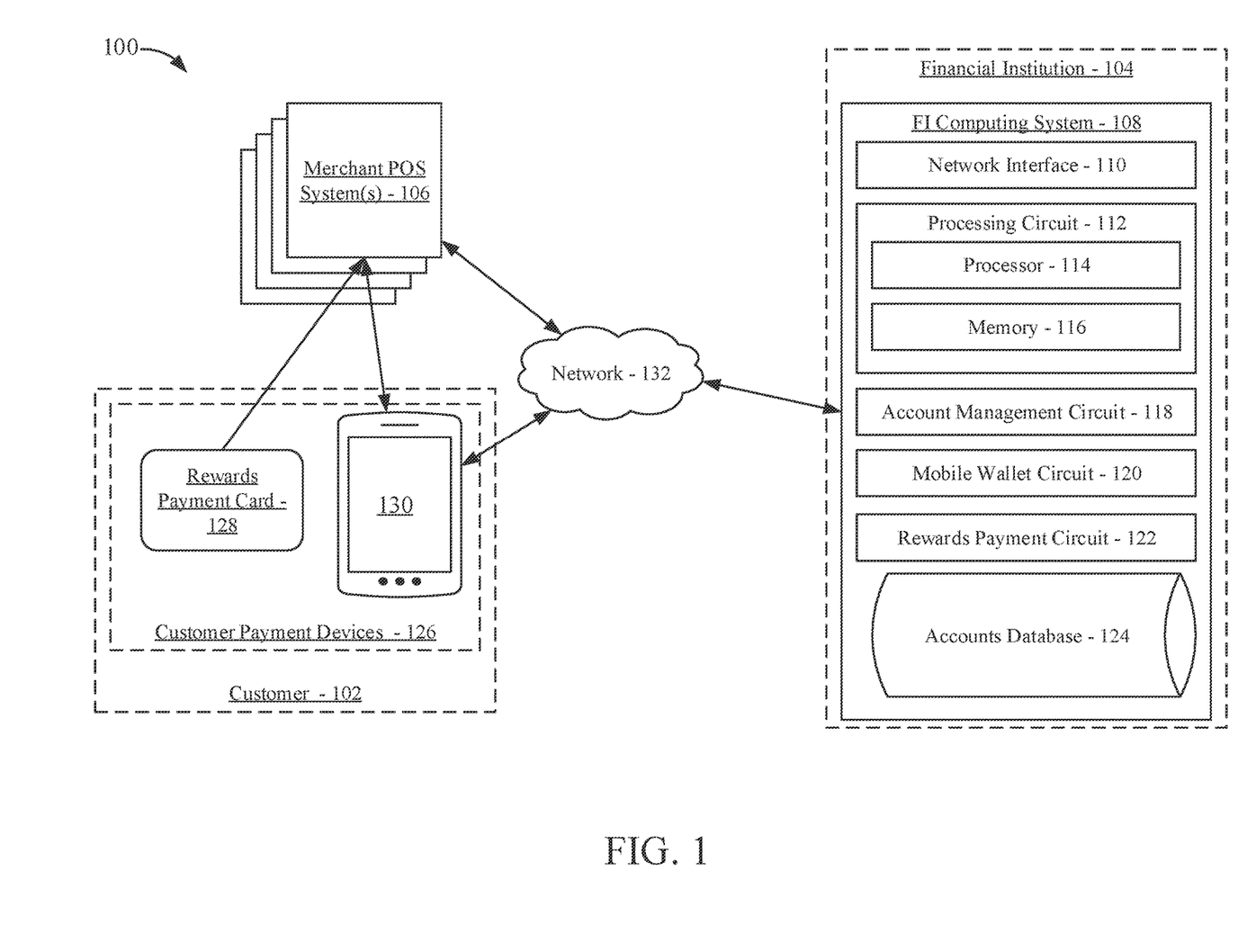
FIG. 1 is a view of a system that facilitates the spending of rewards points accrued in a rewards account according to an example embodiment.

Referring to FIG. 1, a view of a system 100 is shown according to an example embodiment. As described in further detail below, the system 100 facilitates the spending of rewards points accrued in a rewards account by a customer 102 of a financial institution 104 with one or more merchants associated with merchant point-of-sale (POS) systems 106. In some arrangements, the rewards account is associated with a payment account (e.g., a credit account, a line of credit, a demand deposit account, a prepaid account, etc.) maintained by the financial institution 102. In such arrangements, the customer 106 may accrue points in the rewards account by paying for purchases from the payment account, paying off balances associated with the payment account, and/or promotions associated with the payment account. For example, the payment account may be a credit account in which the customer 106 earns a certain number of points for every dollar spent with the credit account (e.g., one point for one dollar, two points for one dollar, a certain percentage of the amount of purchases made, etc.) and/or a certain number of points for every dollar of balance paid off. The system 100 allows the customer 102 to spend the rewards points without first manually converting the rewards points into currency or without first using a currency payment form (e.g., a traditional credit or debit card) and then applying to a rewards points to offset a balance accrued on the currency payment form.

The customer 102 is an account holder with the financial institution 104. For example, the customer 102 may have at least a credit card account with the financial institution 104 that accrues rewards points (e.g., as described above) that are deposited into a rewards account associated with the customer 102 and maintained by the financial institution 104. The financial institution 104 includes a financial institution (FI) computing system 108. The FI computing system 108 maintains information about the customers of the financial institution 104 (including the customer 102) and the various accounts held by the customers of the financial institution 104. Additionally, the financial institution computing system 108 facilitates the use of accrued rewards points directly with merchants.

The financial institution computing system 108 includes a network interface 110. The network interface 110 is structured to facilitate data communication with other computing systems (e.g., a customer device 130, the merchant POS systems 106, credit card processing entities, and the like) via a network 132. The network interface 110 includes hardware and program logic that facilitates connection of the FI computing system 108 to the network 132. For example, the network interface 110 may include a wireless network transceiver (e.g., a cellular modem, a Bluetooth transceiver, a WiFi transceiver, etc.) and/or a wired network transceiver (e.g., an Ethernet transceiver). In some arrangements, the network interface 110 includes the hardware and programming logic sufficient to support communication over multiple channels of data communication (e.g., the Internet and an internal financial institution network). Further, in some arrangements, the network interface 110 is structured to encrypt data sent over the network 132 and decrypt received encrypted data.

The financial institution computing system 108 includes a processing circuit 112 having a processor 114 and memory 116. The processor 114 may be implemented as a general-purpose processor, an application specific integrated circuit (ASIC), one or more field programmable gate arrays (FPGAs), a digital signal processor (DSP), a group of processing components, or other suitable electronic processing components. The memory 116 includes one or more memory devices (e.g., RAM, NVRAM, ROM, Flash Memory, hard disk storage, etc.) that store data and/or computer code for facilitating the various processes described herein. Moreover, the memory 116 may be or include tangible, non-transient volatile memory or non-volatile memory. Accordingly, the memory devices 116 may include database components, object code components, script components, or any other type of information structure for supporting the various activities and information structures described herein.

The FI computing system 104 includes an account management circuit 118, a mobile wallet circuit 120, and a rewards payment circuit 122. Although shown as separate circuits in FIG. 1, in some arrangements, the account management circuit 118, the mobile wallet circuit 120, and/or the rewards payment circuit 122 are part of the processing circuit 116. Other arrangements may include more or less circuits without departing from the spirit and scope of the present disclosure. Further, some arrangements may combine the activities of one circuit with another circuit to form a single circuit. Therefore, those of ordinary skill in the art will appreciate that the present arrangement is not meant to be limiting.

The account management circuit 118 is structured to perform various account management functions relating to the accounts maintained by the financial institution 104. The accounts maintained by the financial institution 104 may include, for example, demand deposit accounts, mortgage accounts, lines of credit, credit card accounts, rewards accounts and the like. Accordingly, the account management circuit 118 is structured to maintain an accounts database 124, update account balances (e.g., in response to transactions associated with the accounts), apply interest to accounts, process payments related to accounts, and the like. The account management circuit 118 is further structured to generate a rewards account for the customer 102. In some arrangements, the account management circuit 118 stores and updates customer information in the accounts database 124, including, for example, customer name, customer address, customer account numbers, customer user name, customer passwords, customer biometric information, and the like.

The mobile wallet circuit 120 is structured to provide a mobile wallet payment platform to customers of the financial institution 104. The mobile wallet payment platform is accessed via mobile wallet applications on mobile devices (e.g., the mobile device 130 associated with the customer 102) associated with the customers of the financial institution. Through the mobile wallet payment platform, the customer 102 can wireless transmit payment information from the mobile device 130 to a merchant POS system 106 thereby eliminating the need for the customer to swipe or insert a traditional payment card (e.g., a credit card or a debit card) at the merchant POS system 106. The payment information is packaged as a data packet that is wireless transmitted from the mobile device 130 to the merchant POS system 106 (e.g., via NFC, via Bluetooth, etc.). The payment information includes a payment token that is a proxy of the payment account being used for the transaction with the merchant. In some arrangements, the payment information includes authentication information, such as an account and device specific cryptogram formed by the mobile device 130 with an encryption key provided by the financial institution 104. The cryptogram may be a one-time use cryptogram such that a new, unique cryptogram is generated by the mobile device 130 for each transaction. The payment information received at the merchant POS system 106 is then routed to the financial computing system 108 via the network 132 (and sometimes via a payment network and/or a payment acquirer). Accordingly, the mobile wallet circuit 118 can then cross-reference the payment token in a token vault to identify the corresponding payment account, and the decrypt cryptogram to verify that the payment token was provided by the mobile device 130 in deciding whether to approve or deny the transaction request associated with the payment information. To facilitate the mobile wallet payment platform, the mobile wallet circuit 120 is also structured to generate payment tokens, associate payment tokens with payment accounts, generate device-specific encryption key pairs (e.g., specific to the mobile device 130), and to provision the payment token and/or one of the encryption keys of the pair to the mobile device 130 for use.

The rewards payment circuit 122 is structured to facilitate payments associated with rewards accounts held by the customers of the financial institution 104. Specifically, the rewards payment circuit 122 is structured to provide rewards account balance information (e.g., both a number of points and a spending power in currency associated with the number of points) to the mobile wallet application on the mobile device 130 via the mobile wallet circuit 120. Additionally, the rewards payment circuit 122 is structured to approve or deny transaction requests associated with the rewards accounts maintained by the financial institution 104.

The FI computing system 104 includes the accounts database 124. In some arrangements, the accounts database 124 is part of the memory 118. The accounts database 124 is structured to hold, store, categorize, and otherwise serve as a repository for information associated with accounts (e.g., loan accounts, savings accounts, checking accounts, credit accounts, rewards accounts, etc.) held by the financial institution 104. For example, the accounts database 124 may store account numbers, account balances, transaction information, account ownership information, and the like. The accounts database 124 is structured to selectively provide access to information relating to accounts at the financial institution 104 (e.g., to the customer 102 via a mobile device 130).

Still referring to FIG. 1, the system 100 includes at least one merchant POS system 106. Each of the merchant POS systems 106 is affiliated with a merchant that the customer 102 can purchase goods or services from. Each of the merchant POS systems 106 is structured to receive payment information from a customer 102 (e.g., via a payment card, via a mobile wallet, etc.), to transmit a payment request to the financial institution 104 (e.g., directly or indirectly via a payment network), and to relay a payment approval or denial to the customer 102.

The customer 102 is associated with various customer payment devices 126 that are linked to a rewards account associated with the customer 102. As described above, the rewards account includes a balance of rewards points that is maintained by the financial institution 104. The rewards account may be linked to different payment devices 126, including a traditional payment card 128 (e.g., having a magstripe and/or smartchip in the same manner as a traditional credit card) and a mobile wallet client running on a mobile device 130 associated with the customer 102. The mobile wallet client provides the customer 102 access to the mobile wallet payment platform provided by the financial institution 104. The mobile device 130 is capable of transmitting a data packet containing payment information to a merchant POS system 106 wirelessly (e.g., via NFC). The mobile device 130 may be, for example, a smartphone or a tablet computing system.

The devices of the system 100 communicate via the network 132. The network 132 may include any combination of the Internet and an internal private network (e.g., a private network maintained by the financial institution 104).

Generally, through the system 100, the customer 102 can opt to pay for a purchase with a merchant directly from a rewards account via one of the customer payment devices. The system 100 eliminates the need for the customer to either (1) first convert the rewards point into currency accepted by the merchant or (2) use a currency payment device and then redeem rewards points from the rewards account to offset the purchase in a statement. The operation of the system 100 is described in further detail below with respect to FIGS. 2-4.

Figure 2:
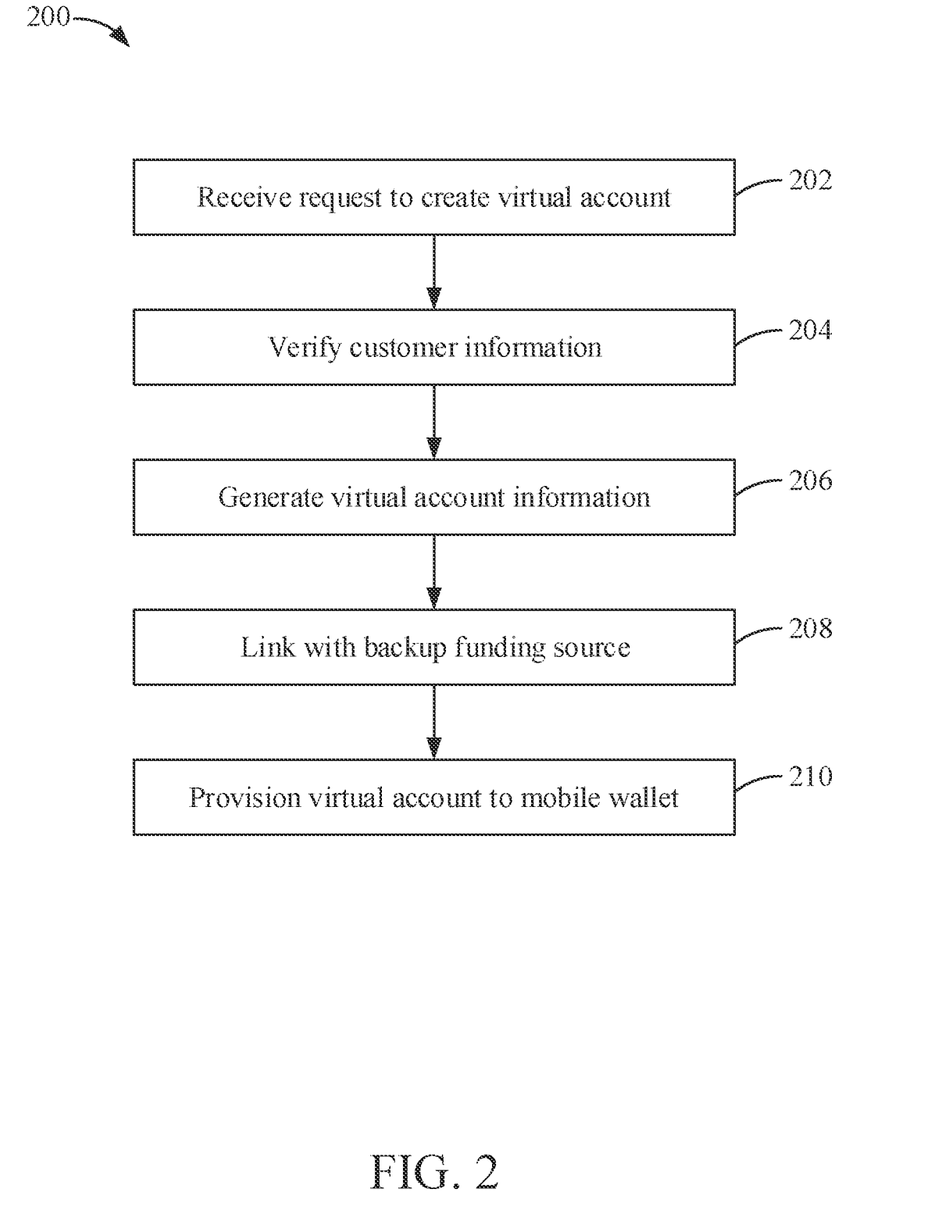
FIG. 2 is a flow diagram of a method of creating a rewards virtual account and provisioning the virtual account to a mobile device according to an example embodiment.

Referring to FIG. 2, a flow diagram of a method 200 of creating a rewards virtual account and provisioning the virtual account to a mobile device is shown according to an example embodiment. The method 200 is performed by the financial institution computing system 108 (e.g., via a combination of the account management circuit 118, the mobile wallet circuit 120, and the rewards payment circuit 122). Generally, the method describes the creation of a virtual payment account linked to a rewards account associated with the customer 102. The virtual payment account allows the customer 102 to transact with a merchant directly from the customer's rewards points balance in the rewards account. In some arrangements, the virtual payment account is linked to a backup funding source (i.e., a secondary payment account) that is used when the amount of rewards points in the customer's rewards account is not enough to cover the value of the transaction between the customer 102 and the merchant thereby reducing the risk of denied transactions for the customer.

The method 200 begins when a request to create a virtual account is received at 202. The financial institution computing system 108 receives the request from the customer 102. In some arrangements, the request is received from the customer 102 via the mobile device 130 (e.g., via a mobile wallet application or a mobile banking application running on the mobile device 130). The request includes customer authentication information (e.g., username, password, biometric, PIN, etc.) and an identified rewards account associated with the customer 102. The request serves as notice that the customer 102 wants a payment device (e.g., a mobile wallet) linked to the rewards account.

Customer information is verified at 204. The financial institution computing system 108 verifies the received customer information, including the existence of a valid rewards account. The financial institution computing system 108 verifies the customer authentication information by cross-referencing the received customer authentication information with known and verified customer authentication (e.g., by comparing a received username/password combination with a verified username/password combination). Additionally, the financial institution computing system 108 cross-references the accounts database 124 to identify the indicated rewards account and to verify that the rewards account is both (1) associated with the customer 102 and (2) is approved for being linked to a payment device. If at least one of the customer authentication information or the rewards account cannot be verified, the method 200 ends.

However, the description of the method 200 proceeds under the assumption that the customer 102 and the rewards account are both verified.

Virtual account information is generated at 206. The financial institution computing system 108 generates virtual account information for a payment device that is linked to the rewards account. The virtual account information allows the customer 102 to transact with a merchant (e.g., via the merchant POS system 106) directly out of the rewards account. The virtual account information may include, for example, a primary account number (PAN) and an expiration date. The PAN may be a 12 to 16 digit number resembling a credit/debit card number. In some arrangements, the PAN includes an issuer identification number (IIN) as a leading portion of the PAN. The IIN is selected to route transactions attempted with a payment device linked to the virtual account directly to the financial institution computing system 108 for processing (e.g., the IIN informs an acquirer or payment network to route transaction requests to the financial institution 102 for processing). The financial institution computing system 108 stores the generated virtual account information in the accounts database 124.

The virtual account payment information is linked with a backup funding source at 208. In some arrangements, the customer 102 may identify a backup funding source for the virtual account as part of the request received at 202. The backup funding source may be, for example, a credit card account, a demand deposit account, or the like. In transactions in which the balance of points in the rewards account is insufficient to contemplate a given purchase request, the backup funding source is used to supplement the points in the rewards account to approve the transaction, thereby eliminating denied transactions. Accordingly, the financial institution computing system 108 associates the backup funding source with the virtual account information stored in the accounts database 124.

The virtual account is provisioned to a mobile wallet at 210. The financial institution computing system 108 (e.g., via the mobile wallet circuit 120) provisions the virtual account as a payment device to a mobile wallet associated with the customer 102 (e.g., a mobile wallet that is running on the mobile device 130). In doing so, the financial institution computing system 108 generates a payment token and instructions for generating a cryptogram that are transmitted to the mobile device 130. The payment token serves as a proxy for the PAN of the virtual account. In some arrangements, the payment token is time limited (e.g., expires after a designated period of time, such as one day) or use limited (e.g., expires after a designated number of uses). Accordingly, the financial institution computing system 108 is configured to periodically re-provision a new token to the mobile wallet. The instructions for generating a cryptogram are used by the mobile device 130 to generate a cryptogram for each purchase. The cryptogram is unique to the mobile device 130 and is unique for each transaction. The instructions for generating the cryptogram may include, for example, an encryption key and an algorithm used to generate a verification code that is encrypted with the encryption key. The financial institution 108 can decrypt the cryptogram received with a given payment request to verify that the payment request originated from the customer's mobile wallet (and only the customer's mobile wallet) on the mobile device 130.

In some arrangements, a physical payment card (e.g., a payment card having the appearance of a credit card) linked to the virtual account is issued by the financial institution 104 to the customer 102. The physical payment card allows the customer to access the virtual account in situations where a merchant does not accept mobile wallet payments or when the customer 102 does not have access to the mobile wallet payment platform.

Figure 3:
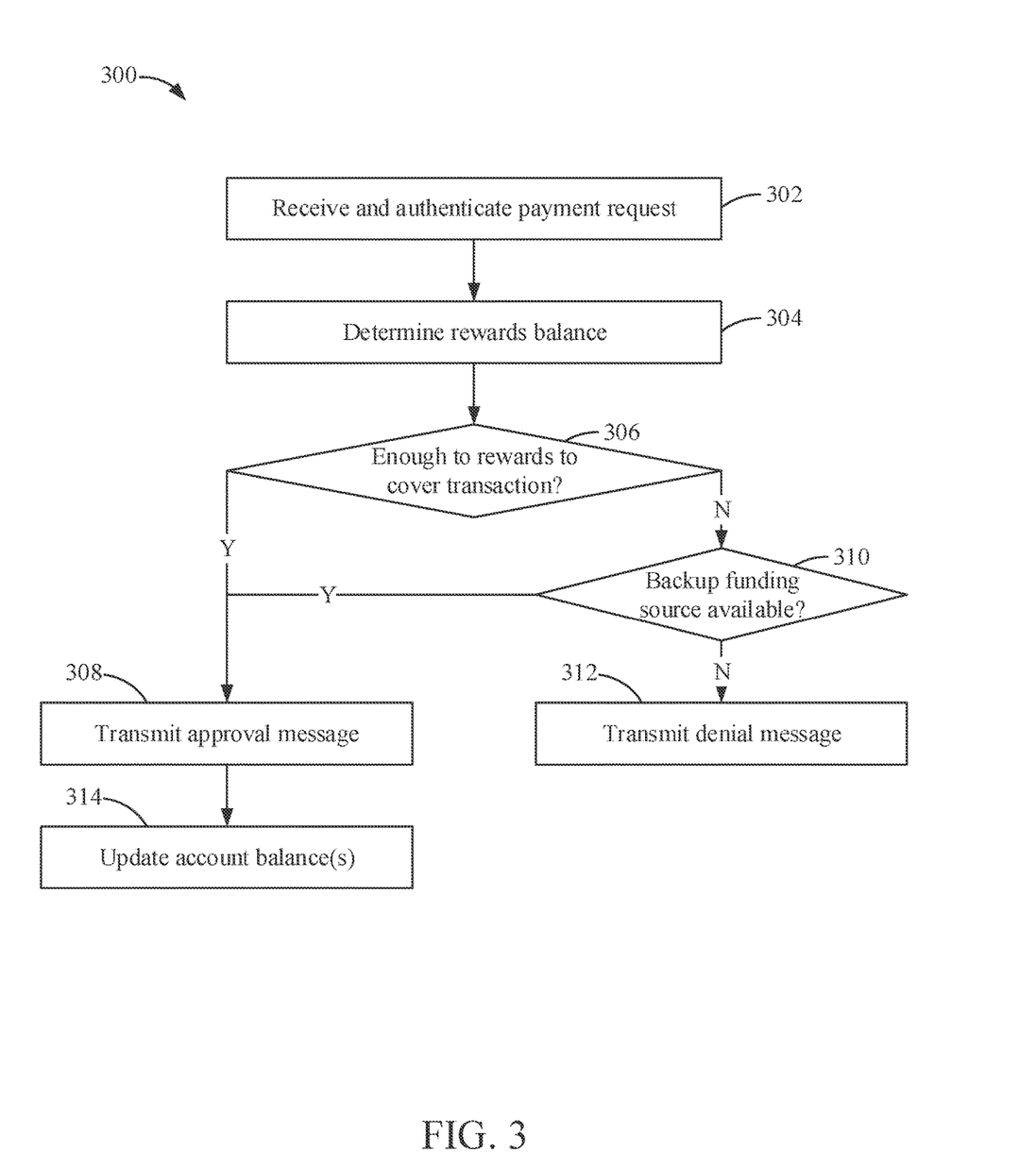
FIG. 3 is a flow diagram of a method of processing a payment request associated with a virtual account linked to a rewards account according to an example embodiment.

Referring to FIG. 3, a flow diagram of a method 300 of processing a payment request associated with a virtual account linked to a rewards account (e.g., as created during the method 200) is shown according to an example embodiment. The method 300 is performed by the financial institution computing system 108 (e.g., via a combination of the account management circuit 118, the mobile wallet circuit 120, and the rewards payment circuit 122). Generally, the method 300 describes the processing of a payment request from a merchant associated with a virtual payment account that is linked to a rewards account of the customer 102. The financial institution computing system 108 approves or denies the payment request based on the amount of rewards points in the rewards account and/or the availability of a backup funding source.

The method 300 begins a payment request is received and authenticated at 302. The financial institution computing system 108 receives the payment request. In some arrangements, the payment request is received from a merchant POS system 106 via a payment network or another payment processing entity. The payment request is routed to the financial institution computing system 108 based on the IIN of the token or PAN. The payment request includes, at least, a token or PAN, an amount of the payment request, and a merchant identifier. In arrangements where the payment request was initiated from a mobile wallet client on the mobile device 130, the payment request also includes a cryptogram. In such arrangements, the cryptogram may be decrypted to verify that the received token was transmitted from the mobile device 130 associated with the customer 102 as opposed to a different mobile device attempting to fraudulently transact with the token. If the cryptogram does not decrypt properly, the method ends and a denial message is transmitted (e.g., as discussed below with respect to step 312). However, the description of the method 300 continues under the assumption that the cryptogram was successfully decoded and verified.

A rewards balance is determined at 304. The financial institution computing system 108 identifies the rewards account associated with the token or PAN and determines a balance of the rewards account. In some arrangements, the available balance of the rewards account is different than the actual balance of the rewards account. For example, for certain merchants, the financial institution 104 may offer a rewards multiplier that increases the value of the rewards point at the merchant. So, if the customer 102 is transacting with a merchant offering a two-times multiplier 100 rewards points may be worth $2 instead of $1.

Based on the balance determined at 304, the financial institution computing system 108 determines if there are enough rewards points to cover the cost of the payment request at 306. If there is a greater than or equal value of points in the rewards account needed to complete the payment request (e.g., based on a conversion rate of points to currency, which may vary by merchant), an approval message is transmitted at 308. The financial institution computing system 108 transmits the approval message to the merchant POS system 106 (e.g., via a payment network or another payment processing entity through the network 132). Upon receipt of the approval message at the merchant POS system 106, the merchant can approve and complete the transaction with the customer 102.

If there are not enough rewards points to cover the cost of the payment request, the financial institution computing system 108 determines the availability of a backup funding source at 310. As described above with respect to the method 200, the customer 102 can link a backup funding source to the virtual account. The financial institution computing system 108 determines the presence of a valid (i.e., funded) backup funding source that can be used to fund the difference between the requested transaction amount and the points balance of the rewards account. If a backup funding source is available, an approval message is transmitted at 308 (in the same manner as discussed above). If a backup funding source is not available, a denial message is transmitted at 312. The financial institution computing system 108 transmits the denial message to the merchant POS system 106 (e.g., via a payment network or another payment processing entity through the network 132). Upon receipt of the denial message at the merchant POS system 106, the merchant can deny the contemplated transaction with the customer 102 (or request an alternate payment form).

In another embodiment, instead of transmitting a denial message to the merchant POS system 106 at 312, a partial authorization message is transmitted. The partial authorization message includes the available balance of the rewards account associated with the token or PAN. In this way, the merchant can relay the available balance of the rewards account to the customer 102. At this point, the customer 102 can change their purchase (e.g., remove or exchange an item) to lower the purchase amount at the merchant or select a second form of payment. Accordingly, the financial computing system 108 then determines that there are enough rewards points to cover the cost of the payment request by comparing the new purchase amount with the available rewards balance (e.g., step 306) and transmits the approval message to the merchant POS system 106 (e.g., step 308).

In situations in which an approval message is transmitted at 308, the appropriate account balances are updated at 314. The financial institution computing system 108 updates (i.e. debits) the balance associated with the rewards account in the accounts database 124. In arrangements where the payment request was completed at least in part based on a backup funding source, the financial institution computing system 108 updates the balance associated with the backup funding source in the accounts database 124. In some arrangements, an updated balance of the rewards account is transmitted to the customer 102 via the mobile device 130 for display on the mobile wallet client (e.g., as shown in FIG. 4).

Figure 4:
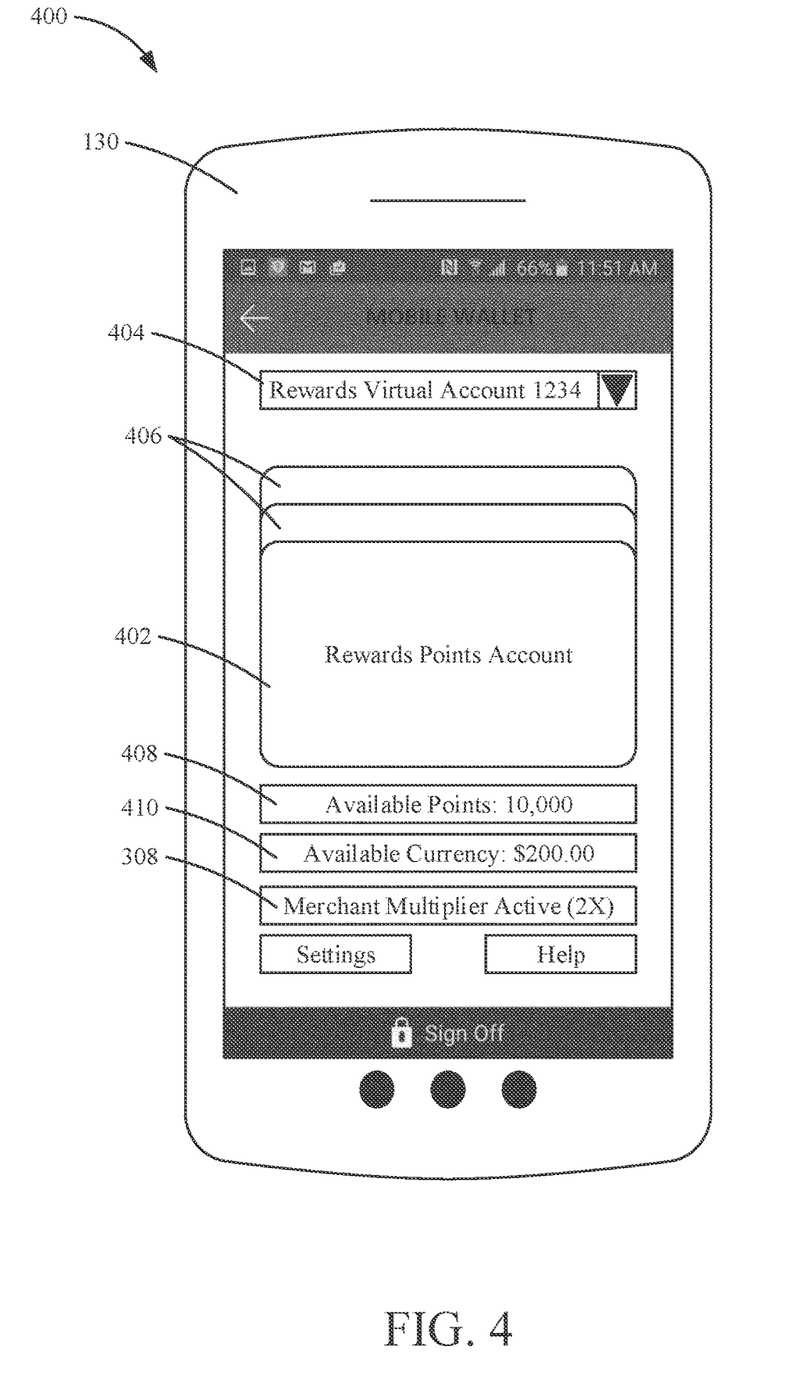
FIG. 4 shows a mobile wallet user interface according to an example embodiment.

Referring to FIG. 4, a mobile wallet user interface 400 is shown according to an example embodiment. The user interface 400 shows a view of the mobile wallet client associated with the mobile wallet payment platform of the financial institution 104 as shown on the display of the mobile device 130. As shown in FIG. 4, the customer 102 has the rewards account 402 as the active payment source. The customer 102 can toggle between available payment methods through a drop-down menu 404 or by selecting alternate images 406 representative of the different payment accounts. When the customer 102 has the rewards account 402 as the active payment source, the user interface presents a current account balance in points at 408 and the equivalent account balance in currency at 410. Based on the determined location of the mobile device 130, a merchant multiplier 412 may be activated if the mobile device 130 is determined as being within a merchant that is participating in a multiplier promotion with the financial institution 104. As shown in FIG. 4, there is a two-times multiplier for the points at the current merchant. Accordingly, the available currency is $200 (at a conversion rate of 100 points per $2) instead of the non-multiplied available currency of $100 (at a conversion rate of 100 points per $1).

The above described systems and methods allow for customers of the financial institution 104 that earn rewards points (e.g., by transacting with a rewards credit card) to spend the rewards points directly with merchants. From the perspective of the merchant, the merchant processes the transaction as if a traditional mobile wallet transaction (or payment card transaction) is occurring, and the financial institution computing system 108 settles the transaction from the rewards account. Accordingly, no additional or new payment infrastructure is needed by the merchants or the payment networks to directly accept rewards points from the customers, which results in more convenient payment options for the customers of the financial institution 104.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more dedicated processors communicatively coupled to one or more dedicated memory or memory devices. In this regard, the one or more dedicated processors may execute instructions stored in the dedicated memory or may execute instructions otherwise accessible to the one or more dedicated processors. In some embodiments, the one or more dedicated processors may be embodied in various ways. The one or more dedicated processors may be constructed in a manner sufficient to perform at least the operations described herein. In some embodiments, the one or more dedicated processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more dedicated processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more dedicated processors may take the form of a single core processor, multi-core processor (e.g., a dual core processor, triple core processor, quad core processor, etc.), microprocessor, etc.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method comprising:
    generating, by a provider computing system, an encryption key pair;
    transmitting, by the provider computing system, an encryption key of the encryption key pair to a mobile device of a customer;
    receiving, by the provider computing system, a payment request from a merchant computing system for a transaction between a merchant and a customer, wherein the payment request includes a payment token and a first amount associated with the transaction in currency, and wherein a rewards account stores a number of rewards points;
    authenticating, by the provider computing system, the payment request, wherein authenticating the payment request comprises:
        generating a device-specific cryptogram according to the transmitted encryption key, wherein the device-specific cryptogram is associated with the mobile device of the customer; and
        decrypting the device-specific cryptogram using the non-transmitted encryption key to verify the payment token was provided by the mobile device of the customer;
    determining, by the provider computing system, a currency conversion value for the number of rewards points, wherein the currency conversion value is based on a merchant multiplier that is activated based on a location of the customer;
    determining, by the provider computing system, the number of rewards points in the rewards account is not enough to cover the first amount associated with the transaction based on the currency conversion value;
    transmitting, by the provider computing system and to the merchant computing system in response to determining the number of rewards points is not enough to cover the first amount, a partial authorization message including an approval amount indicating the currency conversion value;
    receiving, by the provider computing system and in response to the partial authorization message, a modification to the payment request, wherein the modification to the payment request includes a second amount associated with the transaction, wherein the second amount is less than the first amount;
    comparing, by the provider computing system, the second amount associated with the transaction to the number of rewards points in the rewards account;
    determining, by the provider computing system, based on the comparison, that the number of rewards points in the rewards account is enough to cover the second amount; and
    transmitting, by the provider computing system, an approval message to the merchant computing system.

2. The method of claim 1, wherein the conversion rate is variable based on an identity of the merchant.

3. The method of claim 1, further comprising, updating, by the provider computing system, a balance associated with the rewards account and a secondary payment source.

4. The method of claim 3, wherein the updated balance associated with the secondary payment source is based on an amount of additional currency needed to cover a remaining balance of the amount of the transaction in currency.

5. The method of claim 3, further comprising transmitting, by the provider computing system, the updated balance associated with the rewards account and the secondary payment source to the mobile device of the customer.

6. The method of claim 1, wherein the number of rewards points in the rewards account are only accepted by a provider associated with the provider computing system.

7. The method of claim 3, wherein the secondary payment source is a credit card account or a checking account.

8. The method of claim 1, wherein the payment token is configured to expire after a predetermined number of uses and to relationally map to a payment account of the customer in an accounts database of the provider computing system.

9. A provider computing system associated with a provider, the system comprising:
    a processing circuit comprising a processor and memory, the processing circuit configured to:
        generate an encryption key pair;
        transmit an encryption key of the encryption key pair to a mobile device of a customer;
        receive a payment request from a merchant computing system for a transaction between a merchant and a customer, wherein the payment request includes a payment token and a first amount associated with the transaction in currency, and wherein a rewards account stores a number of rewards points;

authenticate the payment request by:
  generating a device-specific cryptogram according to the transmitted encryption key, wherein the device-specific cryptogram is associated with the mobile device of the customer; and
  decrypting the device-specific cryptogram using the non-transmitted encryption key to verify the payment token was provided by the mobile device of the customer;

determine a currency conversion value for the number of rewards points, wherein the currency conversion value is based on a merchant multiplier that is activated based on a location of the customer;

determine the number of rewards points in the rewards account is not enough to cover the first amount associated with the transaction based on the currency conversion value;

transmit, to the merchant computing system and in response to determining the number of rewards points is not enough to cover the first amount, a partial authorization message including an approval amount indicating the currency conversion value;

receive, in response to the partial authorization message, a modification to the payment request, wherein the modification to the payment request includes a second amount associated with the transaction, wherein the second amount is less than the first amount;

compare the second amount associated with the transaction to the number of rewards points in the rewards account;

determine, based on the comparison, that the number of rewards points in the rewards account is enough to cover the second amount; and transmit an approval message to the merchant computing system.

10. The system of claim 9, wherein the conversion rate is variable based on an identity of the merchant.

11. The system of claim 9, wherein the processing circuit is further configured to update a balance associated with the rewards account and a secondary payment source; and
  wherein the updated balance associated with the secondary payment source is based on an amount of additional currency needed to cover a remaining balance of the amount of the transaction in currency.

12. The system of claim 11, wherein the processing circuit is further configured to transmit the updated balance associated with the rewards account and the secondary payment source to the mobile device of the customer.

13. The system of claim 11, wherein the secondary payment source is a credit card account or a checking account.

14. The system of claim 9, wherein the number of rewards points in the rewards account are only accepted by the provider.

15. The system of claim 9, wherein the payment token is configured to expire after a predetermined number of uses and to relationally map to a payment account of the customer in an accounts database of the provider computing system.

16. A processing circuit comprising one or more processors coupled with a non-transitory processor-readable medium storing processor-executable code for causing the processing circuit to:

generate an encryption key pair;

transmit an encryption key of the encryption key pair to a mobile device of a customer;

receive a payment request from a merchant computing system for a transaction between a merchant and a customer, wherein the payment request includes a payment token and a first amount associated with the transaction in currency, and wherein a rewards account stores a number of rewards points;

authenticate the payment request by:
  generating a device-specific cryptogram according to the transmitted encryption key, wherein the device-specific cryptogram is associated with the mobile device of the customer; and
  decrypting the device-specific cryptogram using the non-transmitted encryption key to verify the payment token was provided by the mobile device of the customer;

determine a currency conversion value for the number of rewards points, wherein the currency conversion value is based on a merchant multiplier that is activated based on a location of the customer;

determine the number of rewards points in the rewards account is not enough to cover the first amount associated with the transaction based on the currency conversion value;

transmit, to the merchant computing system and in response to determining the number of rewards points is not enough to cover the first amount, a partial authorization message including an approval amount indicating the currency conversion value;

receive, in response to the partial authorization message, a modification to the payment request, wherein the modification to the payment request includes a second amount associated with the transaction, wherein the second amount is less than the first amount;

compare the second amount associated with the transaction to the number of rewards points in the rewards account;

determine, based on the comparison, that the number of rewards points in the rewards account is enough to cover the second amount; and transmit an approval message to the merchant computing system.

* * * * *